Jan. 13, 1931.　　　C. GOODMAN　　　1,788,572

TRANSMISSION OF ELECTRICITY TO VEHICLES

Filed Oct. 19, 1929

Inventor
Charlie Goodman

By Clarence A. O'Brien
Attorney

Patented Jan. 13, 1931

1,788,572

UNITED STATES PATENT OFFICE

CHARLIE GOODMAN, OF CHICAGO, ILLINOIS, ASSIGNOR TO CHARLES H. HIBBE, OF CHICAGO, ILLINOIS

TRANSMISSION OF ELECTRICITY TO VEHICLES

Application filed October 19, 1929. Serial No. 400,890.

The present invention appertains to improvements in the transmission of electricity to vehicles and more particularly to the transmission of electricity through rails to electrical apparatus on vehicles operating thereon.

The principal object of this invention is to provide means whereby the possibility of persons becoming shocked by contact with the rails is eliminated.

Figure 1:
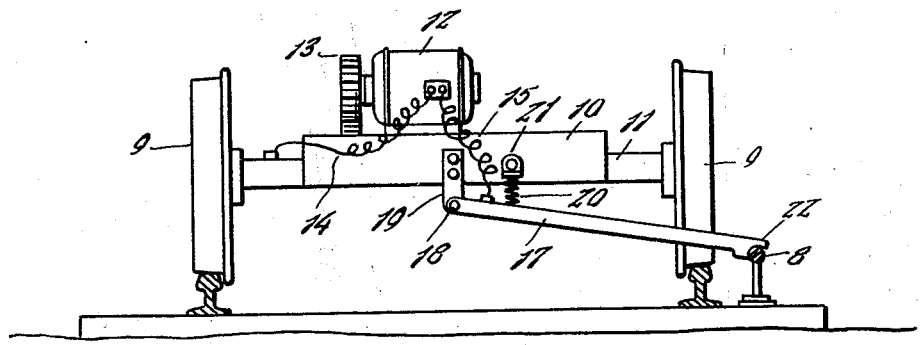
Figure 1 represents a cross sectional view through the rail and showing the portion of a vehicle supported thereon with its motor properly connected to the rails.
Figure 2:
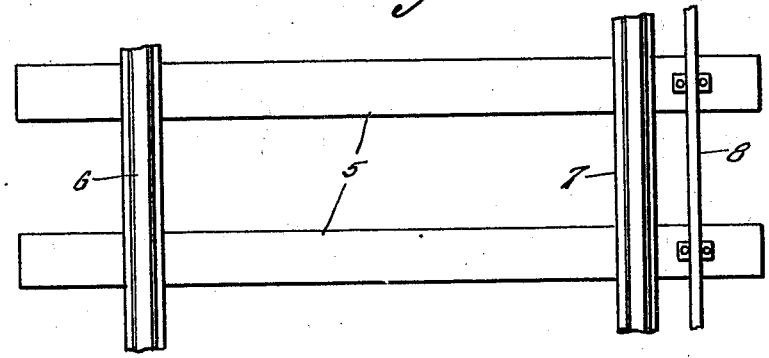
Figure 2 represents a fragmentary top plan view of the rails.
Figure 3:
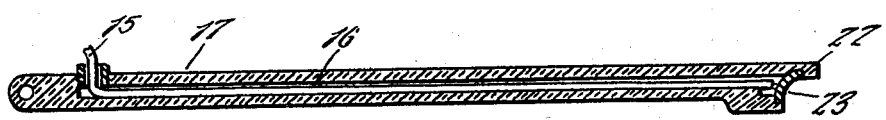
Figure 3 represents a longitudinal sectional view through the collector arm.

Referring to the drawings, wherein like numerals designate like parts, it will be seen that numerals 5 indicate the usual ties on which the rails 6, 7 and 8 are laid. The rails 6 and 7 serve to support the vehicle, while the third rail 8 is a conductor for electricity.

In Figure 1, wheels 9—9 are connected to the truck and axles 10 and 11 of a piece of rolling stock. Mounted upon the truck or any other suitable support on the rolling stock is the motor 12 for operating the vehicle, the same being geared as at 13 for driving the vehicle.

The platform 10 is of some suitable di-electric material and the axle aforementioned is preferably divided into a pair of sections, if some other provision is not found more suitable for insulating the wheels 9—9 from each other. A connection 14 is made between one section of the axle and the motor 12, while a second connection 15 is made between the opposite side of the motor and the conductor 16, which passes longitudinally through the elongated hollow arm 17.

The upper end of this arm is pivotally connected to the platform 10 by means of the pin and bracket 18 and 19 respectively. A spring 20 is interposed between a bracket 21 on the platform 10 and the aforementioned arm 17.

The free end of the arm is provided with a reduced extension 22 and at this end of the arm an arcuate shaped contact plate 23 is provided and connected to the conductor 16. This plate 23 rides against the third rail 8 for collecting the energy therefrom. The rail 6 forms the opposite side of the metallic circuit and as is obvious by reason of the connection 14.

It will thus be seen that the present invention offers means which will be far less susceptible to the development of defects than analogous means now in use and furthermore, while the foregoing description definitely refers to certain details, it is to be understood that changes may be made therein without departing from the spirit and scope of the invention as claimed hereinafter.

Having thus described the invention, what is claimed as new is:

Means for transmitting energy to vehicles, in combination, a truck including wheels, a pair of rails for supporting the truck, a third rail for conducting energy, a motor on the truck for driving the truck, a connection between one wheel of the truck and one side of the motor, a collector comprising an elongated hollow arm of di-electric material, a conductor disposed longitudinally therethrough, means for pivotally supporting the arm at one end to the truck, a plate at the opposite end of the arm to which the conductor is attached and which is adapted to ride against the third rail, and a connection between the opposite side of the motor and the said conductor.

In testimony whereof I affix my signature.

CHARLIE GOODMAN.